(No Model.)
F. W. BANAN.
SEED PLANTER.
No. 503,938. Patented Aug. 29, 1893.
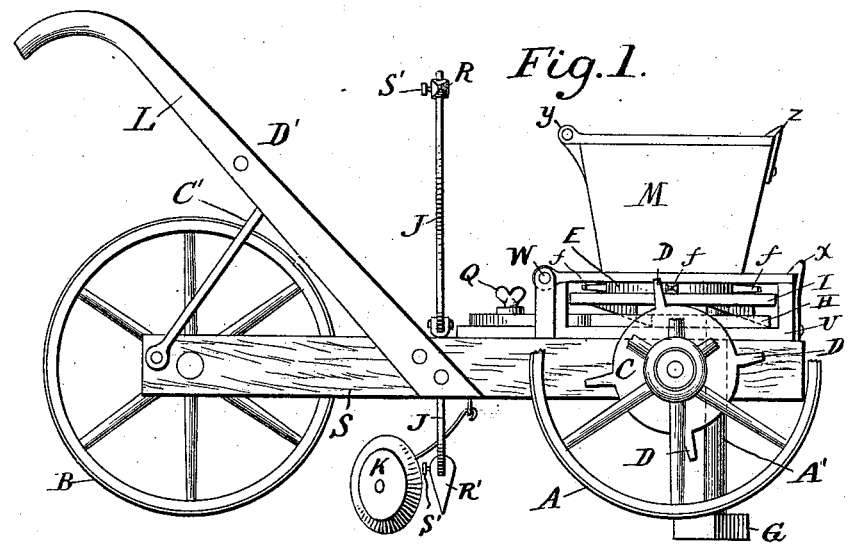
Fig. 1.
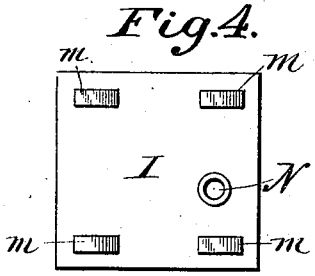
Fig. 4.
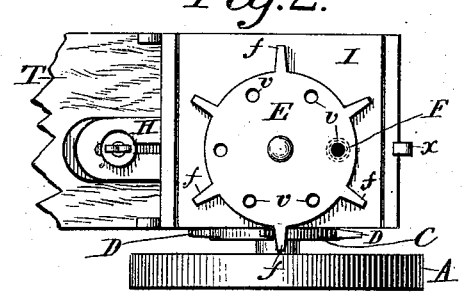
Fig. 2.
Fig. 5.
Fig. 3.
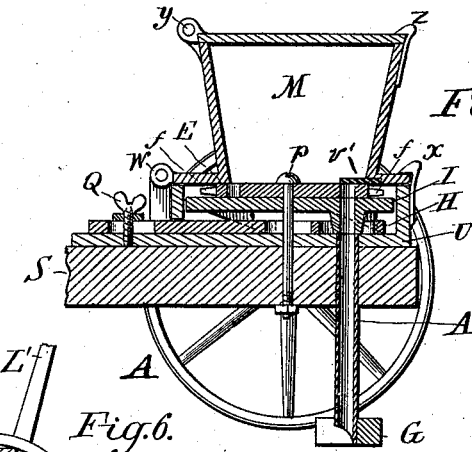
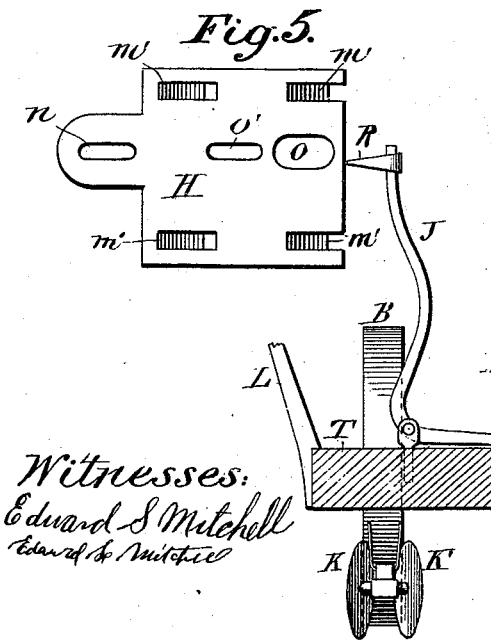
Fig. 6.
Witnesses:
Edward S. Mitchell
Edward S. Mitchell
Inventor.
Francis W. Banan
per
L. K. Fowler
Attorney

UNITED STATES PATENT OFFICE.

FRANCIS W. BANAN, OF EAST KNOX, MAINE.

SEED-PLANTER.

SPECIFICATION forming part of Letters Patent No. 503,938, dated August 29, 1893.

Application filed November 11, 1892. Serial No. 451,593. (No model.)

*To all whom it may concern:*

Be it known that I, FRANCIS W. BANAN, of East Knox, in the county of Waldo and State of Maine, have invented a new and useful Seed-Planter, of which the following is a specification.

My object is to provide a hand machine which will deposit the seed in either hills or drills as may be desired.

I attain my object by the mechanism illustrated in the accompanying drawings, in which—

Figure 1 is a side view of the machine showing front wheel A, rear wheel B, and wheel C with arms D projecting at regular intervals from its periphery, also showing measuring disk E with arms $f$ projecting at regular intervals from its periphery and arms D engage with arms $f$ so as to convey motion to measuring disk E, also showing hollow conducting tube A' which carries pointed furrower G, also showing the location of the plates H and I which are fitted with inclined planes hereinafter described, also showing marker J and covering disks K and K' and handles L and L'. Fig. 2 is a plan-view of the front of the machine with the hopper M removed, and shows the measuring disk E and arms D engaged with arms $f$. Fig. 3 is a longitudinal sectional view showing the relative positions of the hopper M, the measuring disk E, the plates H and I, the hollow tube A' and pointed furrower G. Fig. 4 is an inverted plan view of plate I showing the arrangement of the inclined planes $m, m, m, m$, also the aperture N through which the seed passes into hollow tube A'. Fig. 5 is a plan-view of plate H showing the inclined planes $m', m', m', m'$, the aperture O through which the seed passes, the aperture O' through which bolt or pin P passes, and the slot $n$ through which thumbscrew Q passes which holds plate H in place. Fig. 6 is a sectional view showing the relative positions of the rear wheel B with the covering disks K and K', also the marker J.

The body of the machine is composed of the side pieces S S and the cross pieces T. T. On the top of the cross piece near the forward end is the plate U which has a lip projecting upward at both ends, and on this plate U is the plate H, see Fig. 1 and on top of plate H is plate I whose inclined planes or projections $m\ m\ m\ m$ fit into the inclined planes or depressions $m'\ m'\ m'\ m'$ in plate H, while the lip at either end of plate U effectually prevents any end motion of plate I.

On top of plate I is journaled the measuring disk E which has a series of apertures V arranged on a circle near its circumference, which apertures V are the receptacles for the seed and which measure the seed, and as the measuring disk E revolves these apertures V pass over the top of hollow tube A' thereby permitting the seed to pass down through hollow tube A' to the earth. On top of the lips which project upward from either end of plate U rests the hopper M which has a hinge W at its rear side and a spring catch X at its front. The cover of the hopper has a hinge Y at its rear side and a spring catch Z in front. The bottom of hopper M has on one side a projection or cut-off V' which extends in over the apertures V in measuring disk E thereby striking off all surplus seed and leaving only what remains in the apertures V to pass down through hollow tube A'. The axle on which the front wheel A is journaled projects outward from the side of the machine near its forward end and the wheel A is kept on by means of a nut or spring pin. The inner part of the hub of front wheel A is made square on which is placed wheel C which has a square hole in its center so as to turn therewith. The wheel C has arms D projecting outward at regular intervals from its periphery which engage with arms $f$ on measuring disk E thereby conveying motion to said disk E.

Each machine is provided with a set of measuring disks of different thicknesses and having apertures V of a size to correspond with the kind of seed desired to plant, and each measuring disk has a different number of arms projecting from its periphery. Each machine is also provided with a set of wheels C each with a different number of arms projecting outward at regular intervals from its periphery thereby enabling the operator to deposit any kind of seed varying in size from that of carrot-seed to beans or corn, and to deposit in hills or drills as may be desired. The hollow tube A projects downward from plate U through the body of machine and carries at its lower end the adjustable pointed furrower G. The furrower G being held in place by a thumb-screw (not shown) can be raised or lowered so as to make a shallow or deep furrow as may be desired. The axle of rear wheel B is passed through the body of machine from side to side near its rear end. The handles L L are secured to the sides of the body of machine by bolts or screws and are further secured by the braces C' and the rung D'. The marker J is hinged to the center of the frame, "see Fig. 6," and curved in such a way that when tilted, either end may be brought near the ground and is provided with points R R' on either end which are adjustable and are held in place by the thumb-screws S' S'. The covering disks K. K' are concave and can be adjustable "i. e.," can be set at an angle or straight and are hung on a frame which is attached to body of machine by a rod which hooks into a staple on under side of body of machine and is raised or lowered by means of a short chain (not shown) which reaches from body of machine down to the frame on which the covering disks K, K' are hung. The inclined planes m' m' m' m' in plate H "Fig. 5" are depressions in the top surface of the plate, the inclines commencing at the surface and extending downward on an angle into the plate, and the inclined planes m m m m on plate I "Fig. 4" are projections which project downward from the under surface of plate I and have the same angle as the inclines in the depressions in plate H, and are of suitable size so as to fit loosely into the depressions in plate H. The function of the inclined planes m' m' m' m' and m m m m is to raise and lower plate I, so as to permit the use of a thin or thick measuring disk E. The raising or lowering of plate I is accomplished by loosening thumb-screw Q and sliding plate H forward or backward. The inclines m' and m being always in contact, the plate I is raised or lowered according as plate H is moved forward or backward.

I am aware that seed drills have been invented and I make no claim to that broadly, but What I do claim, and desire to secure by Letters Patent, is—

The combination in a hand seed-planter of the measuring disk E with the plate I having on its under side the inclined planes m m m m which rest on the inclined planes m' m' m' m' in plate H substantially as shown.

FRANCIS W. BANAN.

Witnesses:
EDWARD S. MITCHELL,
EDWARD L. MITCHELL.